United States Patent
Saito et al.

[11] Patent Number: 5,941,633
[45] Date of Patent: Aug. 24, 1999

[54] HEADLIGHT FOR MOTOR VEHICLE

[75] Inventors: Katsuhisa Saito; Tomonori Aoyama, both of Shizuoka, Japan

[73] Assignee: Koito Manufacturing Co., Ltd., Tokyo, Japan

[21] Appl. No.: 08/773,515

[22] Filed: Dec. 23, 1996

[30] Foreign Application Priority Data

Dec. 25, 1995 [JP] Japan ................................. 7-337447

[51] Int. Cl.⁶ .................................................. B60Q 1/00
[52] U.S. Cl. ...................... 362/543; 362/544; 362/263; 362/240
[58] Field of Search ................................. 362/240, 263, 362/241, 244, 245, 247, 310, 307, 543, 544

[56] References Cited

U.S. PATENT DOCUMENTS

| | | | |
|---|---|---|---|
| 5,140,504 | 8/1992 | Sato | 362/61 |
| 5,188,444 | 2/1993 | Makita et al. | 362/544 |
| 5,353,204 | 10/1994 | Kawamura | 362/61 |
| 5,566,057 | 10/1996 | Iwami | 362/61 |

*Primary Examiner*—Thomas M. Sember
*Attorney, Agent, or Firm*—Sughrue, Mion, Zinn, Macpeak & Seas, PLLC

[57] ABSTRACT

A lamp using a discharge bulb 7 as a dipped-beam lamp LL is arranged in the middle of a triple headlight, and a lighting circuit 23 is arranged in the middle of the headlight. A cord 22 for connecting the lighting circuit 23 and the discharge bulb 7 is short, and the weight balance of the headlight as a whole is stabilized even if the lighting circuit 23 is relatively heavy. Light projected from the discharge bulb 7 expands horizontally toward the auxiliary lamp CL and the main-beam lamp HL, so that the headlight is illuminated as a whole, which in turn improves the external appearance of the headlight.

8 Claims, 5 Drawing Sheets

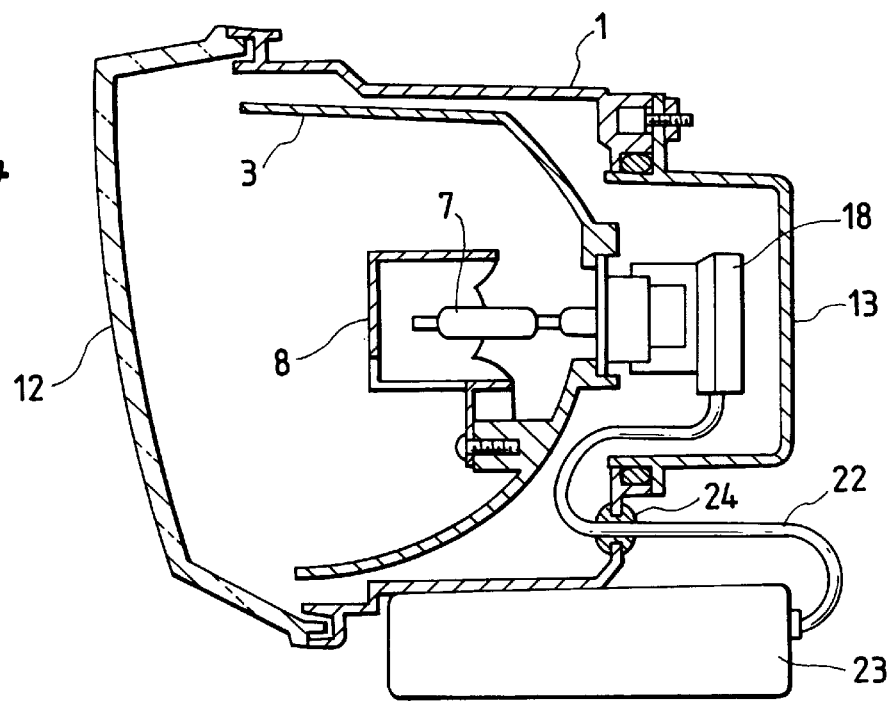
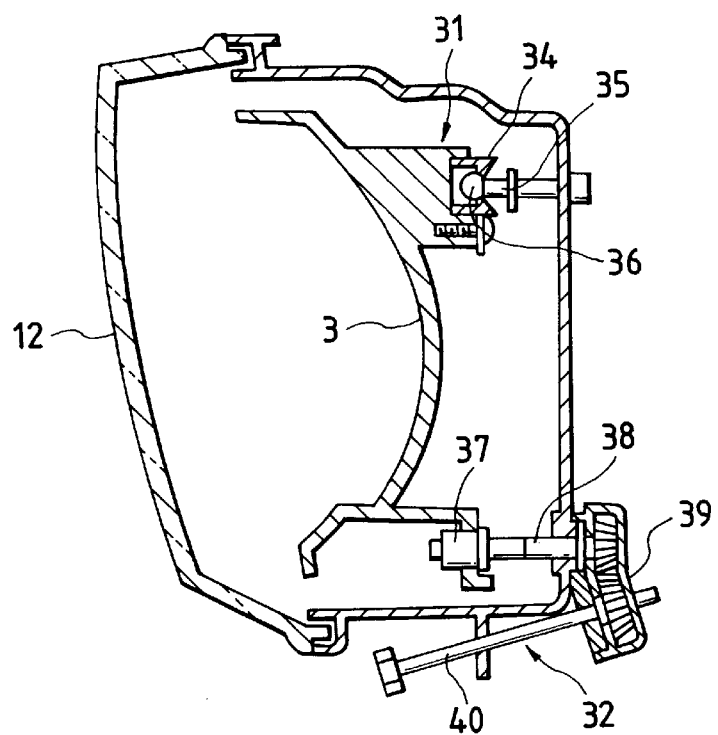

HEADLIGHT FOR MOTOR VEHICLE

BACKGROUND OF THE INVENTION

1. Field of the Invention

The invention relates to an automobile headlight, and more particularly to a headlight having three lamps, i.e., a dipped-beam lamp (or low beam lamp), a main-beam lamp (or high beam lamp), and an auxiliary lamp, continuously arranged in a horizontal row.

2. Related Art

Three lamp headlights having a dipped-beam lamp, a main-beam lamp and an auxiliary lamp having been proposed. A triple headlight is characterized as integrating three lamps including both beam lamps and a fog lamp or other auxiliary lamp with one another in a row in order to meet design requirements, parts reducing requirements, and the like. For example, FIG. 7 shows a headlight having a dipped-beam lamp LL, a main-beam lamp HL, and a fog lamp FL arranged from the outer part to the inner part of an automobile with respect to a headlight body 101. A reflector 102 integrating reflectors 103, 104 for both beam lamps LL, HL, and a reflector 105 for the fog lamp, are juxtaposed within the headlight body 101. In addition, bulbs 106, 107, 108 are provided. Further, a lens 109 is attached to the front of the headlight body 101. The triple headlight is thus formed.

In the thus constructed triple headlight, the possibility of using a discharge bulb having high luminance and good color rendering for the dipped-beam lamp LL has been studied. The discharge bulb requires a lighting circuit for lighting itself. If the lighting circuit is constructed of a metal case and arranged immediately behind the dipped-beam lamp, the weight balance of the headlight is impaired, because the lighting circuit includes a booster transformer and other components that make it relatively heavy. In addition, since there is only a small space between the back of the headlight and the automobile body at the outer part of the headlight, it is difficult to reserve space for arranging the lighting circuit, which in turn makes it difficult to design the headlight.

Thus, the lighting circuit 110 is arranged substantially in the middle of the headlight body 101 toward the back, so that the above noted weight balance and arranging space problems are overcome. However, with this arrangement, a longer cord 111 must be provided for connecting the discharge bulb 106 in the dipped-beam lamp LL at the outer part of the headlight to the lighting circuit 110. Since high voltage is supplied through this cord 111, electromagnetic waves are radiated to produce electric noise which interferes with the instruments in the automobile, e.g., causing noise in the radio, the car telephone, and the like. Further, if the lighting circuit 110 is arranged toward the inner part of the headlight for some reason, the cord 111 becomes extremely long, aggravating the electromagnetic problems.

Further, in the aforementioned triple headlight, the fog lamp FL that is less frequently used for ordinary city cruising is arranged toward the inner part, and the dipped-beam lamp LL that is more frequently used is arranged toward the outer part so as to be remote from the fog lamp. Therefore, when only the dipped-beam lamp LL is lit and the fog lamp FL is not lit during night driving, the headlight is not illuminated as a whole, i.e., only the outer portion is illuminated, which in turn impairs the external appearance of the headlight.

SUMMARY OF THE INVENTION

The objects of the invention are to provide a headlight for motor vehicles which can suppress production of electric noise from the lighting circuit of the discharge bulb and which can improve the external appearance of the headlight during night driving.

The above objects are achieved by providing a headlight for a motor vehicle in which a discharge bulb is used as a light source of at least one lamp arranged in the middle of the headlight. Further, a lighting circuit for lighting the discharge bulb is arranged substantially in the middle of an outer surface of the headlight body. Still further, if at least one lamp arranged toward the outer part of the motor vehicle is an auxiliary lamp, then it is preferable that the auxiliary lamp be arranged rearwardly from the lamp in the middle so that light from the light source is irradiated as far as possible to a lens portion in front of the auxiliary lamp.

BRIEF DESCRIPTION OF THE DRAWING FIGURES

FIG. 4 is a sectional view taken along a line IV—IV of FIG. 1.

FIG. 5 is a sectional view taken along a line V—V of FIG. 1.

DETAILED DESCRIPTION OF THE PREFERRED EMBODIMENTS

Figure 1:
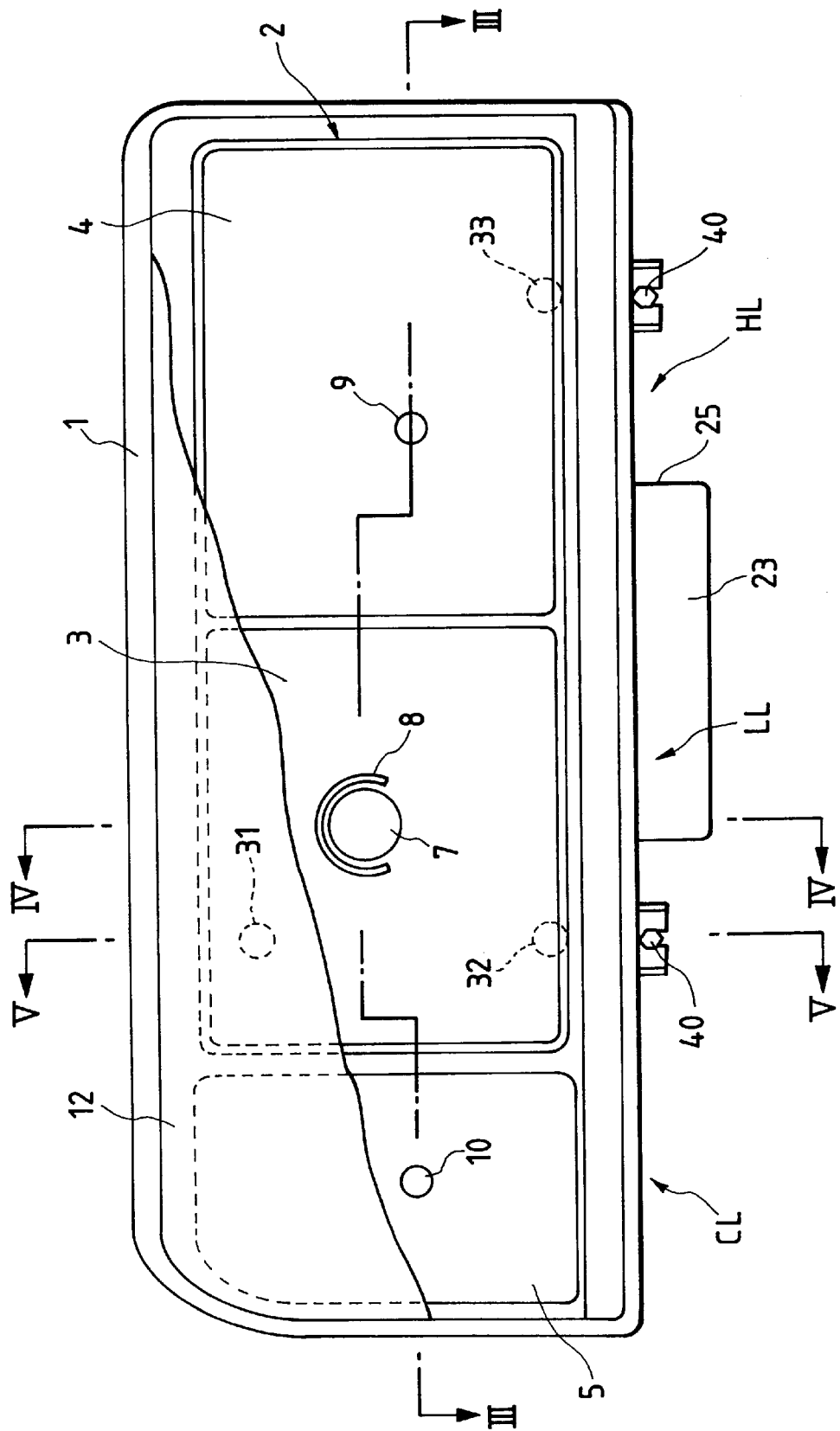
FIG. 1 is a partially cutaway front view of an embodiment of the invention.
Figure 2:
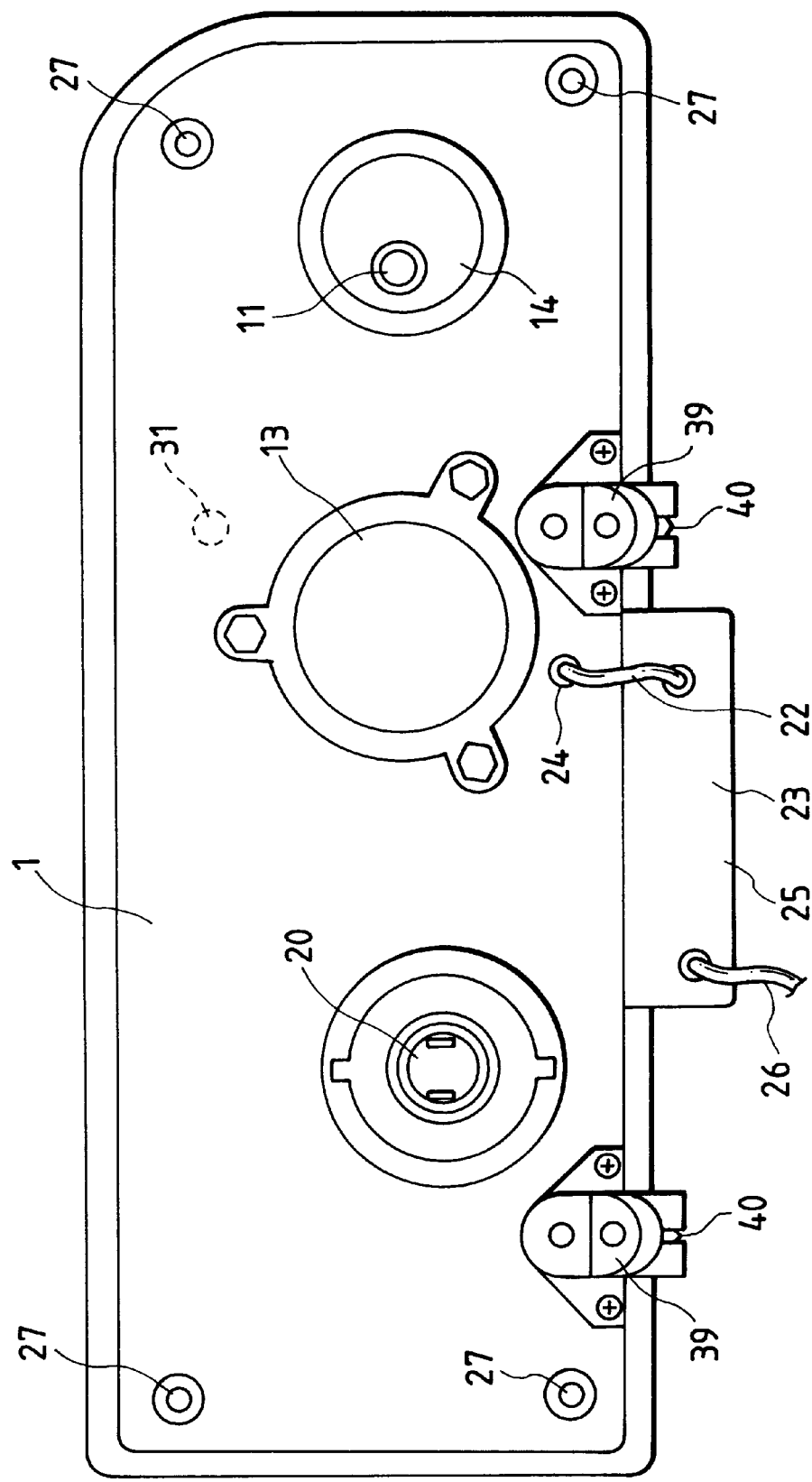
FIG. 2 is a rear view of the headlight in FIG. 1.
Figure 3:
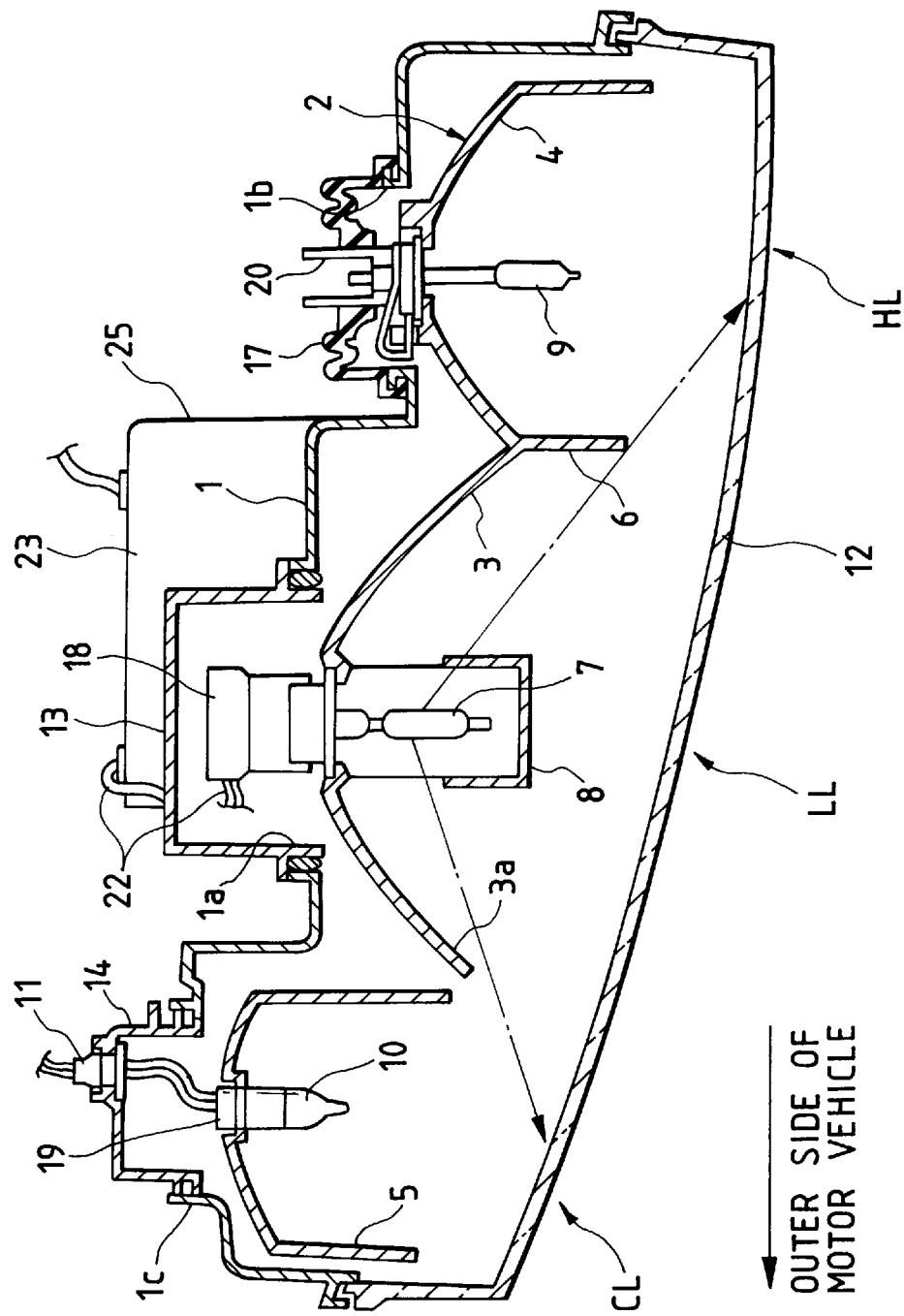
FIG. 3 is a sectional view taken along a line III—III of FIG. 1.

An embodiment of the invention is described below with respect to a triple headlight having a dipped-beam lamp, a main-beam lamp, and a clearance lamp as an auxiliary lamp, all arranged in a single, horizontal row. FIG. 1 is a front view of the headlight with part of a lens thereof cutaway, and FIG. 2 is a rear view thereof. Further, FIGS. 3 to 5 are sectional views taken along lines III—III, IV—IV, and V—V of FIG. 1, respectively. In these drawings, the lamps are arranged in the order of the clearance lamp CL, the dipped-beam lamp LL, and the main-beam lamp HL from the outer part to the inner part of the front of an automobile. In other words, the dipped-beam lamp LL that is frequently used is arranged in the middle of the headlight, and the main-beam lamp HL and the clearance lamp CL are arranged inward and outward with respect to the dipped-beam lamp LL, respectively.

A monolithic reflector 2 is accommodated in a region within the body 1 of the headlight, the region being toward the inner part of the automobile. The monolithic reflector 2 has two paraboloidal reflectors 3, 4 for the dipped-beam lamp LL and the main-beam lamp HL, respectively. These reflectors are integrally formed. Further, an independent reflector 5 for the clearance lamp CL is accommodated in a region within the headlight body 1, the region being toward the outer part of the automobile. The headlight body 1 is curved along the curved front of the automobile such that the front of the headlight body 1 is gradually receded from the inner part to the outer part of the automobile. Therefore, the reflectors 4, 3, 5 and bulbs 9, 7, 10 for the lamps HL, LL, CL are also arranged at such positions as to be receded from the automobile in the order of the main-beam lamp HL, the dipped-beam lamp LL, and the clearance lamp CL.

The monolithic reflector 2 has the reflector 3 for the dipped-beam lamp LL on the outer side thereof and the reflector 4 for the main-beam lamp HL on the inner side thereof. There is a shade 6 (FIG. 3) at the border between both reflectors 3, 4 to define both lamp areas. A discharge bulb 7 is releasably arranged on the reflector 3 for the dipped-beam lamp LL. A bulb shade 8 is attached to the discharge bulb 7 in order to limit the projection area of light from the discharge bulb. Further, a halogen bulb 9 and an incandescent bulb 10 are releasably attached to the reflector 4 for the main-beam lamp HL and the reflector 5 for the clearance lamp CL, respectively.

As described above, the respective lamps are arranged so as to gradually recede toward the automobile body from the inner lamp to the outer lamp. As a result of this arrangement, the front edge portions of the monolithic reflector 2 are inclined backward from the inner side toward the outer side thereof. The reflector 3 for the dipped-beam lamp LL in particular is such that a front edge portion 3a on the outer side thereof close to the clearance lamp CL is arranged so as to recede from the front edge portion of the shade 6 by a relatively large distance, the front edge portion of the shade 6 being at the border with respect to the main-beam lamp HL. As a result, a straight line connecting the discharge bulb 7 and the front edge portion 3a outside the discharge bulb 7 intersects the optical axis of the clearance lamp CL within the headlight body 1, as shown in FIG. 3.

A lens 12 is attached to the opening in the front of the headlight body 1, so that a lamp chamber containing the lamps HL, LL, CL is defined within the headlight body. Aluminum or another reflective material is coated or deposited over the inner surfaces of the reflectors 3, 4, 5 so as to form reflecting surfaces. Further, in this embodiment, aluminum or another reflective material is also coated or deposited over the inner surface of the headlight body 1, so that these surfaces are used not only as part of the reflectors or as a pseudo-reflector, but also as a shield film for shielding a cord 22 of a lighting circuit described below.

A pivot portion 31 for an optical axis adjusting mechanism is arranged in an upper corner of the monolithic reflector 2. Under the pivot portion 31 is a vertical/horizontal optical axis adjusting portion 32. Under the reflector 4 is a vertical optical axis adjusting portion 33. As shown in FIG. 5, the optical axis adjusting pivot portion 31 has a pivot receiving portion 34 integrally attached to the rear of the monolithic reflector 2, and a pivot stud 35 is fixed to part of the headlight body 1 confronting the pivot receiving portion 34 so as to project frontward, so that a pivot 36 on the tip thereof is engaged with the pivot receiving portion 34. The pivot 36 constitutes the pivot portion for oscillating the monolithic reflector 2 vertically as well as horizontally.

Both the vertical/horizontal optical axis adjusting portion 32 and the vertical optical axis adjusting portion 33 have an adjusting nut 37 attached to the rear of the monolithic reflector 2, as well as an adjusting screw 38 rotatably supported on the rear of the headlight body 1 in a position confronting the adjusting nut 37, as shown in FIG. 5. The adjusting screw 38 is screwed into the adjusting nut 37. As a result, the screwing position of the adjusting nut 37 is changed along the length of the adjusting screw 38 by the turning of the adjusting screw 38, so that the monolithic reflector 2 is oscillated vertically and horizontally with the pivot portion 31 as a pivot in an optical axis adjusting operation. Adjusting rods 40 extend toward the front of the headlight body 1 and are coupled to the adjusting screws 38 through bevel gear mechanisms 39. Thus, the optical axis adjustment can be made by operating the adjusting rods 40 from the front side of the headlight.

Socket insertion openings 1a, 1b, 1c (FIG. 3) are arranged in the rear of the headlight body 1 so as to confront the respective bulbs 7, 9, 10. The respective bulbs are releasably mounted in these openings. Removable back covers 13, 14 are attached to the openings 1a, 1c for the dipped-beam lap LL and the clearance lamp CL, respectively. Further, a rubber cover 17 is attached to the opening 1b for the main-beam lamp HL. These covers seal the respective corresponding openings. Connectors 18, 19 are connected directly or indirectly to the bases of the bulbs of the dipped-beam lamp LL and the clearance lamp CL. In this embodiment, the connector 19 of the clearance lamp CL is pulled out of the headlight body 1 through a rubber bushing 11. Further, the main-beam lamp HL has a socket 20 arranged integrally with the base thereof and is connected to a connector (not shown). Stud bolts 27 (FIG. 2) are provided in the rear of the headlight body 1 fixing the headlight to the automobile body.

The cord 22 is connected to the connector 18 that is attached to the base of the discharge bulb 7 of the dipped-beam lamp LL. This cord 22 is pulled out of the headlight body 1 through a cord insertion hole 24 (FIG. 4) in the headlight body 1 and is connected to the lighting circuit 23. The lighting circuit 23 contains, in a metal case 25, a low voltage circuit (not shown) and a starter circuit (not shown) for generating high voltage for lighting the discharge bulb 7. The lighting circuit 23 is fixedly supported on the outer surface of the headlight body 1, such as at the bottom of the headlight body 1. Screws or other fasteners may be used to attach the lighting circuit 23 to the headlight body 1. The lighting circuit 23 is arranged substantially in the middle of the headlight body 1 in a horizontal direction, e.g., substantially immediately under the dipped-beam lamp LL, so that the weight of the headlight is well balanced as a whole. In addition, the length of the cord 22 connecting the discharge bulb 7 that is the light source of the dipped-beam lamp LL to the lighting circuit 23 is designed to be as short as possible. The lighting circuit 23 is electrically connected to a battery (not shown) mounted on the automobile by a cord 26.

The case 25 of the lighting circuit 23 is fixedly supported substantially in the middle of the headlight body 1 in the horizontal direction. Therefore, although the lighting circuit 23 is relatively heavy (since it contains a booster transformer and other components) the weight of the headlight is well-balanced as a whole. Further, in the middle area of the headlight body 1, there is enough space between the rear of the headlight body 1 and the automobile body to accommodate the lighting circuit 23. Therefore, the degrees of freedom in designing the headlight and the automobile are improved.

The lighting circuit 23 is provided in the middle of the headlight body 1 immediately below the dipped-beam lamp LL having the discharge bulb 7. Therefore, the length of the cord 22 connecting the lighting circuit 23 and the discharge bulb 7, and a portion of the length that is to be exposed outside the headlight body 1 in particular, can be minimized. As a result of this construction, electromagnetic waves radiating from the cord 22 can be suppressed, which in turn contributes to preventing noise in the car radio and car telephone, and EMI trouble in other electronic parts. The electromagnetic waves from the cord 22 within the headlight body 1 are also shielded by the aluminum film formed over the inner surface of the headlight body 1.

Figure 6:
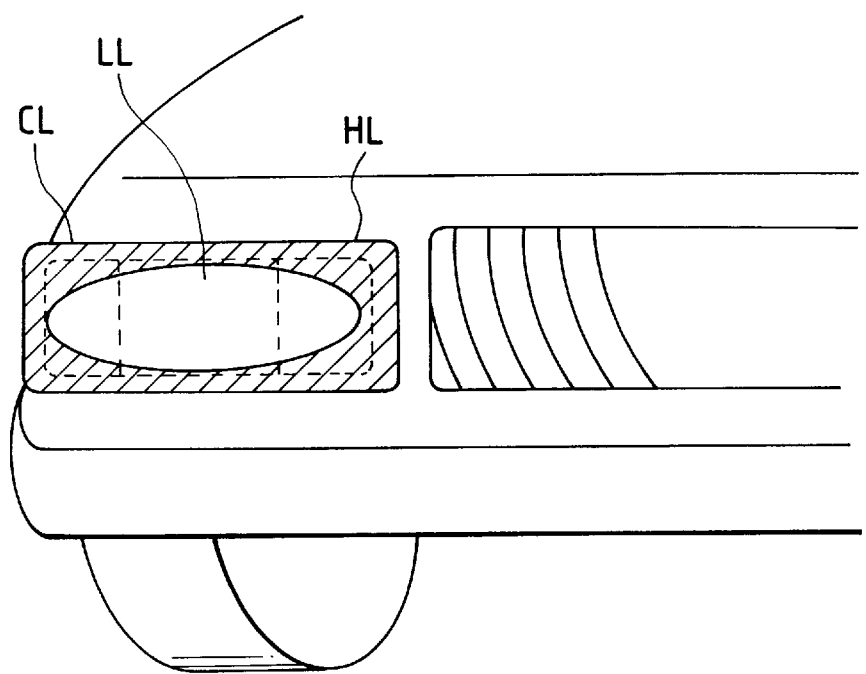
FIG. 6 is a schematic front view showing the degree of illumination of a headlight when the headlight of FIG. 1 is lit.
Figure 7:
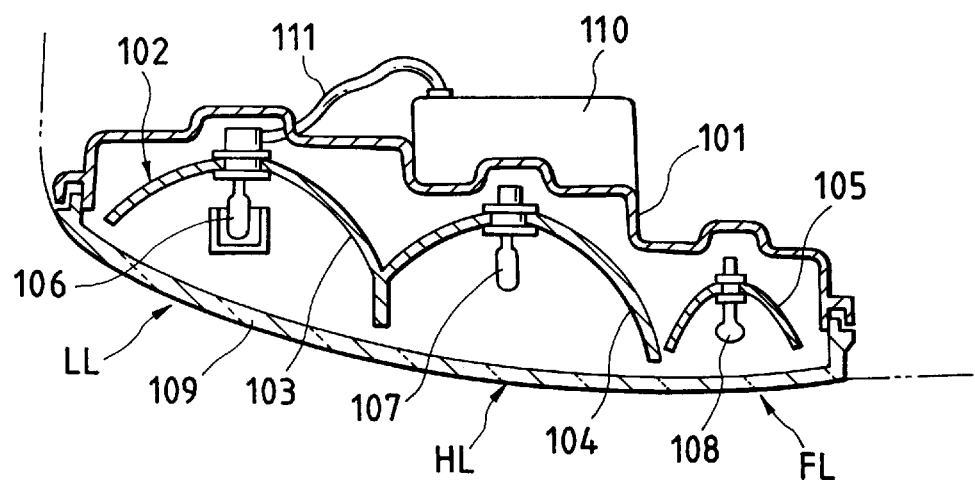
FIG. 7 is a schematic sectional view showing a related triple headlight.

Since the dipped-beam lamp LL (which lamp is frequently used) is arranged in the middle of the three juxtaposed lamps in the headlight, when only the dipped-beam lamp LL is lit, this lamp is highly illuminated compared with the lamps HL, CL flanking the dipped-beam lamp LL. Thus, the illumination of the headlight is well-balanced. Further, since the front edge portion 3a of the reflector 3 of the dipped-beam lamp LL is set back, the light that is not shielded by the front edge portion 3a is projected to the front of the clearance lamp CL as indicated by the chain line in FIG. 1, thereby lighting the lens 12 in the area of the clearance lamp CL. As a result, as shown in FIG. 6, the illumination over the lens portion of the dipped-beam lamp LL is increased, which in turn prevents this lens portion from being darkened compared with the lens portion of the dipped-beam lamp LL in FIG. 7. Hence, the entire surface of the headlight can be uniformly illuminated.

Part of the light from the discharge bulb 7 similarly irradiates the lens portion immediately ahead of the main-beam lamp HL since the light from the discharge bulb 7 is not completely shielded by the shade 6 between the reflectors 3, 4 for the dipped-beam lamp LL and the main-beam lamp HL. Therefore, the lens portion of the main-beam lamp is better illuminated than the lens portions of other lamps even if the main-beam lamp HL is not lit. Hence, in either case, as long as the dipped-beam lamp LL is lit, substantially the entire surface of the lens of the headlight is illuminated, which in turn allows the outer appearance of the automobile to be improved. Even if part of the light from the dipped-beam lamp reaches the clearance lamp and the main-beam lamp, the luminous intensity distributing characteristics are not affected outside the headlight. Inside the headlight, since the quantity of expanded light is small, the luminous intensity distributing characteristics of the dipped-beam lamp as a whole are in no way affected.

In the aforementioned embodiment, the dipped-beam lamp LL is arranged in the middle of the triple headlight, and the discharge bulb 7 is used as the light source of the dipped-beam lamp. Since the discharge bulb has high luminance and long life, it is also possible to arrange the main-beam lamp in the middle and to use the discharge bulb as the light source of the main-beam lamp in large-sized motor vehicles such as trucks that run in the suburbs using the main-beam lamp frequently.

Although a clearance lamp is used as the auxiliary lamp in the aforementioned embodiment, the invention is equally applicable to a case where the headlight is constructed using a different auxiliary lamp, such as a fog lamp. In this case, since the fog lamp is not always lit, the effect of the lens portion ahead of the fog lamp being illuminated by the discharge bulb of the dipped-beam lamp when the fog lamp is not lit is more noticeable than that in the aforementioned embodiment.

As described above, in a triple headlight in which three lamps are arranged so as to be adjacent to one another, the discharge bulb is used as the light source of the lamp arranged in the middle. Therefore, the cord for connecting the lighting circuit and the discharge bulb can be shortened when the lighting circuit is arranged in the middle of the headlight body, which not only allows the headlight to be downsized, but also allows radiation of electromagnetic waves to be suppressed and allows the weight of the headlight to be well-balanced. In addition, since the headlight is illuminated in the middle, a good balance of illumination can be obtained, and the outer appearance of the headlight at the time the headlight is lit can also be improved.

We claim:

1. A headlight for a motor vehicle, said headlight comprising:

a headlight body;

a plurality of lamps horizontally arranged in said headlight body, at least one of said lamps being disposed substantially in a middle of said headlight body, said at least one lamp having a discharge bulb; and a lighting circuit, for lighting said discharge bulb, disposed adjacent said at least one lamp on an outside surface of said headlight body;

wherein three lamps are provided in said headlight body, and said at least one lamp is a middle lamp disposed between the other two lamps.

2. A headlight as recited in claim 1, wherein said lighting circuit is fixed to a bottom of said headlight body.

3. A headlight as recited in claim 1, wherein said middle lamp is a dipped-beam lamp, and an inner lamp as viewed from a front of said motor vehicle is a main-beam lamp.

4. A headlight as recited in claim 2, further comprising a lens enclosing said three lamps inside said headlight body, wherein an outer lamp as viewed from a front of said motor vehicle is an auxiliary lamp, and said auxiliary lamp is disposed so that light from said discharge bulb in said middle lamp is projected onto a portion of said lens directly in front of said auxiliary lamp.

5. A headlight as recited in claim 2, further comprising a lens enclosing said three lamps inside said headlight body, wherein an inner lamp as viewed from a front of said motor vehicle is a main-beam lamp, and said main-beam lamp is disposed so that light from said discharge bulb in said middle lamp is projected onto a portion of said lens directly in front of said main-beam lamp.

6. A headlight as recited in claim 1, further comprising a lens enclosing said plurality of lamps inside said headlight body, wherein said plurality of lamps are disposed so that substantially an entire surface of said lens is illuminated by light from said discharge bulb.

7. A headlight as recited in claim 1, wherein an outer lamp as viewed from a front of said motor vehicle is an auxiliary lamp.

8. A headlight as recited in claim 7, wherein said auxiliary lamp is a clearance lamp.

* * * * *